United States Patent
Winslow

(10) Patent No.: US 12,093,233 B2
(45) Date of Patent: *Sep. 17, 2024

(54) DATABASE INDEXING USING STRUCTURE-PRESERVING DIMENSIONALITY REDUCTION TO ACCELERATE DATABASE OPERATIONS

(71) Applicant: Era Software, Inc., Bainbridge Island, WA (US)

(72) Inventor: Robert Winslow, Oakland, CA (US)

(73) Assignee: ServiceNow Delaware LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/084,716

(22) Filed: Dec. 20, 2022

(65) Prior Publication Data

US 2023/0124432 A1   Apr. 20, 2023

Related U.S. Application Data

(63) Continuation of application No. 17/681,569, filed on Feb. 25, 2022, now Pat. No. 11,561,948.

(Continued)

(51) Int. Cl.
*G06F 16/22* (2019.01)
*G06F 16/2455* (2019.01)
(Continued)

(52) U.S. Cl.
CPC ...... *G06F 16/221* (2019.01); *G06F 16/24558* (2019.01); *G06F 40/284* (2020.01)

(58) Field of Classification Search
CPC . G06F 16/221; G06F 16/24558; G06F 40/284
See application file for complete search history.

(56) References Cited

U.S. PATENT DOCUMENTS

| 6,438,562 B1 | 8/2002 | Gupta |
| 6,718,338 B2 | 4/2004 | Vishnubhotla |

(Continued)

OTHER PUBLICATIONS

Kraska, T. et al. (Jun. 10-15, 2018). "The Case for Learned Index Structures", SIGMOD'18, Houston, TX, US, https://doi.org/10.1145/3183713.3196909.

(Continued)

*Primary Examiner* — Kris E Mackes
*Assistant Examiner* — Cecile H Vo
(74) *Attorney, Agent, or Firm* — McDonnell Boehnen Hulbert & Berghoff LLP

(57) ABSTRACT

Embodiments of the present disclosure are directed to systems and methods for managing a database. In one or more examples, the system obtains input data comprising one or more data entries, where each data entry comprises one or more data items, and each data item comprises a field name and a field value. The system can generate a key-value set for each data item to obtain a plurality of key-value sets. Each key-value set includes at least a first key element comprising the field name of the respective data item and a second key element comprising the field value of the respective data item. The system can sort and store the plurality of key-value sets in the database. The system can further receive a query indicative of a field name or a field value, and generate, for display, an output based on retrieved key elements sets based on the query.

16 Claims, 14 Drawing Sheets

Related U.S. Application Data

(60) Provisional application No. 63/155,041, filed on Mar. 1, 2021.

(51) Int. Cl.
*G06F 40/284* (2020.01)
*G06F 40/00* (2020.01)

(56) References Cited

U.S. PATENT DOCUMENTS

| | | |
|---|---|---|
| 7,437,349 B2 | 10/2008 | Basu |
| 7,743,077 B2 | 6/2010 | Gaurav |
| 8,380,714 B2 | 2/2013 | Inagaki |
| 9,122,722 B2 | 9/2015 | Collins |
| 9,852,377 B1 | 12/2017 | Kumar |
| 10,127,285 B2 | 11/2018 | Vuppala |
| 10,402,379 B2 | 9/2019 | Riggs |
| 10,474,701 B2 | 11/2019 | Ebaugh |
| 10,853,162 B2 | 12/2020 | Haridas |
| 10,853,728 B1 | 12/2020 | Walters |
| 10,956,448 B2 | 3/2021 | Bernhardy |
| 11,341,126 B2 | 5/2022 | Panuganty |
| 11,561,948 B1 | 1/2023 | Winslow |
| 2015/0127628 A1 | 5/2015 | Rathod |
| 2015/0317349 A1 | 11/2015 | Chao |
| 2015/0347484 A1* | 12/2015 | Klauke ................ G06F 16/221 707/741 |
| 2016/0117361 A1* | 4/2016 | Boyle ................... G06F 16/243 707/780 |
| 2017/0109352 A1 | 4/2017 | Aronovich |
| 2017/0132271 A1 | 5/2017 | Jiao |
| 2017/0161352 A1 | 6/2017 | Horii |
| 2019/0108248 A1 | 4/2019 | Rajan |
| 2019/0209022 A1 | 7/2019 | Sobol |
| 2021/0103838 A1 | 4/2021 | Yuan |
| 2021/0216520 A1* | 7/2021 | Wang .................... G06F 16/258 |
| 2021/0224687 A1 | 7/2021 | Goldszmidt |
| 2021/0334664 A1 | 10/2021 | Li |
| 2022/0253419 A1* | 8/2022 | Karlberg ............... G06F 16/185 |
| 2023/0049969 A1 | 2/2023 | Bolikowski |
| 2023/0401230 A1 | 12/2023 | Vissapragada |

OTHER PUBLICATIONS

U.S. Appl. No. 18/053,728, filed Nov. 8, 2022.
U.S. Appl. No. 18/053,735, filed Nov. 8, 2022.
Office Action, U.S. Appl. No. 18/053,728, mailed Mar. 16, 2023.
Office Action, U.S. Appl. No. 18/053,735, mailed Mar. 10, 2023.
Notice of Allowance, U.S. Appl. No. 18/053,728, mailed Jun. 8, 2023.
Office Action, U.S. Appl. No. 18/053,735, mailed Nov. 6, 2023.
Office Action, U.S. Appl. No. 18/053,735, mailed Jul. 20, 2023.
Notice of Allowance, U.S. Appl. No. 18/053,735, mailed Mar. 15, 2024.

* cited by examiner

INPUT DATA 101

```
{"id": "0", "n": 0,   "name": "a"}
{"id": "1", "n": 100, "name": "b", "timeout": 3},
{"id": "2", "n": 200, "name": "c"}
```

FIG. 1A

ROW STORAGE 103

```
{"id": "0", "n": 0,   "name": "a"},
{"id": "1", "n": 100, "name": "b", "timeout": 3},
{"id": "2", "n": 200, "name": "c"}
```

FIG. 1B

COLUMN STORAGE 105

```
"id": ["0", "1", "2"],
"n": [0, 100, 200],
"name": ["a", "b", "c"],
"timeout": [3]
```

FIG. 1C

INPUT DATA 301

```
{"id": "0", "n": 0, "name": "a"},
{"id": "1", "n": 100, "name": "b"},
{"id": "2", "n": 200, "name": "c"} "timeout": 3},
```

FIG. 3A

KEY-VALUE MAP 307

```
id:0
id:1
id:2
n:0
n:100
n:200
name:a
name:b
name:c
timeout:3
```

FIG. 3B

INPUT DATA 401

```
{"id": "10", "reading": 99, "type": "a"}
{"id": "20", "reading": 99, "type": "z"}
{"id": "30", "reading": 100, "type": "z", "delay": 3},
```

FIG. 4A

INVERTED INDEX 403

```
"reading": {
    "99": [10, 20],
    "100": [30]
},
"type": {
    "a": [10],
    "z": [20, 30]
},
"delay": {
    "3": [20]
}
```

FIG. 4B

COLUMN STORAGE 405

```
"reading:99": [10, 20],
"reading:100": [30],
"type:a": [10],
"type:z": [20, 30],
"delay:3": [20]
```

FIG. 4C

KEY-VALUE MAP 407

```
delay:3:20
reading:100:30
reading:99:10
reading:99:20
type:a:10
type:z:20
type:z:30
```

FIG. 4D

INPUT DATA 501

```
"id": 0,
"timestamp": "January 1st, 12am, 2019 UTC",
"text": "quick fox"

"id": 1,
"timestamp": "January 2nd, 12pm, 2019 UTC",
"text": "red foxes"
```

FIG. 5A

PROCESSED DATA 511

```
"id": 0,
"timestamp": 1546329600,
"text": [
  "qui",
  "uic",
  "ick",
  "ck ",
  "k f",
  " fo",
  "fox"
]

"id": 1,
"timestamp": 1546459200,
"text": [
  "red",
  "ed ",
  "d f",
  " fo",
  "fox",
  "oxe",
  "xes"
]
```

FIG. 5B

SORTED KEY-VALUE MAP 507

```
text:" fo":0
text:" fo":1
text:"ck ":0
text:"d f":1
text:"ed ":1
text:"fox":0
text:"fox":1
text:"ick":0
text:"k f":0
text:"oxe":1
text:"qui":0
text:"red":1
text:"uic":0
text:"xes":1
timestamp:1546329600:0
timestamp:1546459200:1
```

FIG. 5D

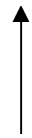

UNSORTED KEY-VALUE SETS 509

```
timestamp:1546329600:0
text:"qui":0
text:"uic":0
text:"ick":0
text:"ck ":0
text:"k f":0
text:" fo":0
text:"fox":0
timestamp:1546459200:1
text:"red":1
text:"ed ":1
text:"d f":1
text:" fo":1
text:"fox":1
text:"oxe":1
text:"xes":1
```

FIG. 5C

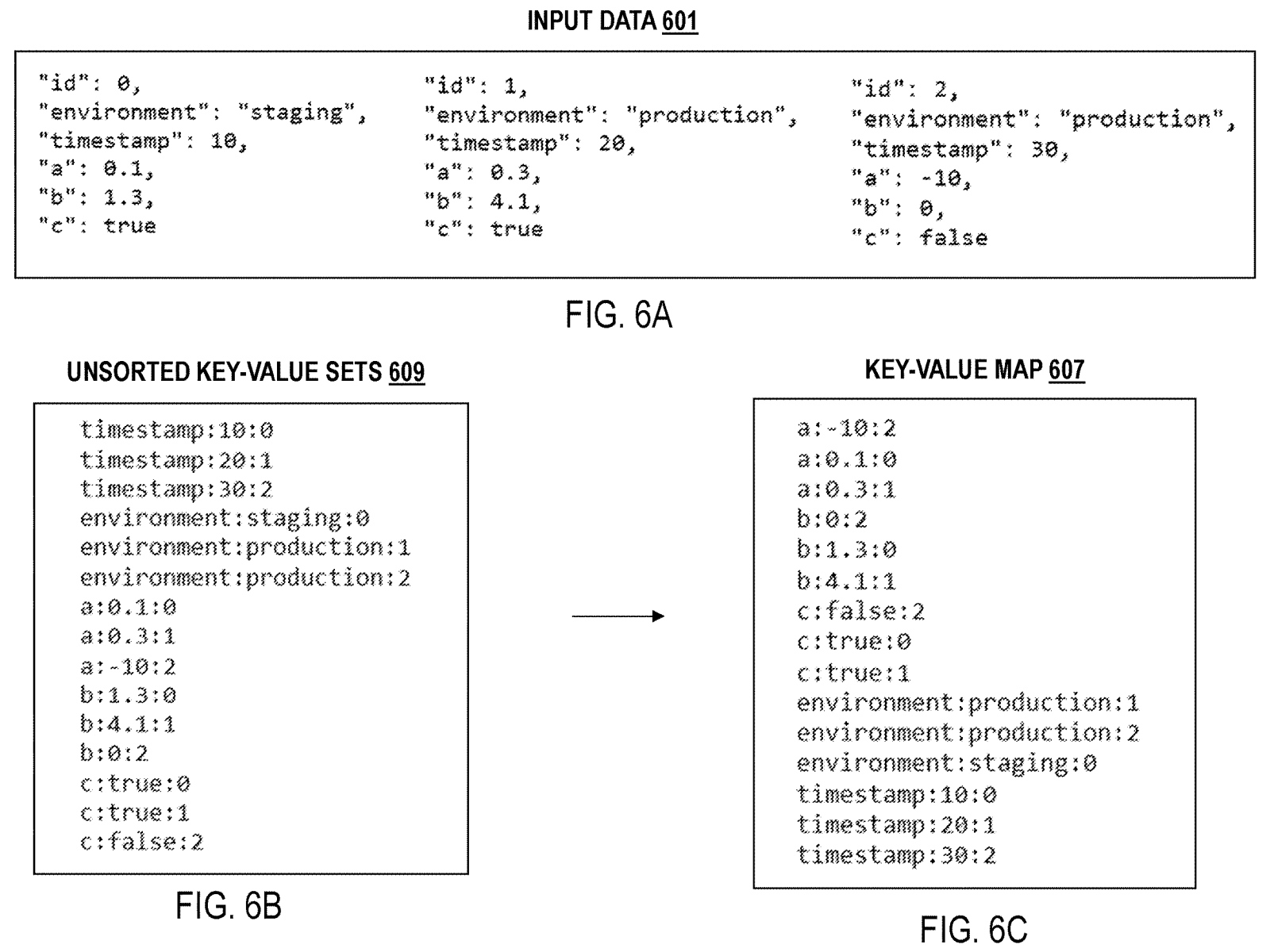

INPUT DATA 601

```
"id": 0,
"environment": "staging",
"timestamp": 10,
"a": 0.1,
"b": 1.3,
"c": true "id": 1,
"environment": "production",
"timestamp": 20,
"a": 0.3,
"b": 4.1,
"c": true "id": 2,
"environment": "production",
"timestamp": 30,
"a": -10,
"b": 0,
"c": false
```

FIG. 6A

UNSORTED KEY-VALUE SETS 609

```
timestamp:10:0
timestamp:20:1
timestamp:30:2
environment:staging:0
environment:production:1
environment:production:2
a:0.1:0
a:0.3:1
a:-10:2
b:1.3:0
b:4.1:1
b:0:2
c:true:0
c:true:1
c:false:2
```

FIG. 6B

KEY-VALUE MAP 607

```
a:-10:2
a:0.1:0
a:0.3:1
b:0:2
b:1.3:0
b:4.1:1
c:false:2
c:true:0
c:true:1
environment:production:1
environment:production:2
environment:staging:0
timestamp:10:0
timestamp:20:1
timestamp:30:2
```

FIG. 6C

INPUT DATA 701

```
"id": 0,
"a": {
    "b": "foo"
},
"c": false
```

```
"id": 1,
"a": {
    "b": "bar"
},
"c": 42
```

```
"id": 2,
"a": "z",
"d": [
    "xyz",
    123
]
```

```
"id": 3,
"abc": null
```

FIG. 7A

UNSORTED KEY-VALUE SETS 709

```
map:a:map:b:string:foo:0
map:c:string:foo:0
map:a:map:b:string:bar:1
map:c:number:42:1
map:a:string:z:2
map:a:map:b:array:string:xyz:2
map:a:map:b:array:number:123:2
map:abc:null:3
```

FIG. 7B

SORTED KEY-VALUE MAP 707

```
map:a:map:b:array:number:123:2
map:a:map:b:array:string:xyz:2
map:a:map:b:string:bar:1
map:a:map:b:string:foo:0
map:a:string:z:2
map:abc:null:3
map:c:number:42:1
map:c:string:foo:0
```

FIG. 7C

METADATA STORE 813

```
"bar": 1234
"baz": 5678
"foo": 9012
```

FIG. 8A

INPUT DATA 801

KEY-VALUE MAP 807

```
bar:1
baz:100
foo:10000
```

FIG. 8C

DATABASE INDEXING USING STRUCTURE-PRESERVING DIMENSIONALITY REDUCTION TO ACCELERATE DATABASE OPERATIONS

CROSS-REFERENCE TO RELATED APPLICATIONS

This application claims priority to and the benefit of U.S. patent application Ser. No. 17/681,569, filed Feb. 25, 2022, the disclosure of which is herein incorporated by reference in its entirety. U.S. patent application Ser. No. 17/681,569 claims priority to and the benefit of U.S. Provisional Patent Application No. 63/155,041, filed Mar. 1, 2021, the disclosure of which is herein incorporated by reference in its entirety.

FIELD OF DISCLOSURE

The present disclosure relates generally to systems and methods for managing a database, and more specifically to systems and methods for managing a database and providing data retrieval that can efficiently perform queries on datasets that exhibit any combination of cardinality, dimensionality, sparsity, hierarchical structure, relational structure, or schemalessness.

BACKGROUND

Recent years have seen an explosion in the production and collection of data. The data collected can produce relatively large and complex data stores that consume a significant amount of storage. Moreover, users often access the data via queries to identify data and/or process the data to produce various statistics and metrics. However, as the volume and/or complexity of data increases, accessing the data to perform such queries can result in slow searches that consume processing power.

For example, one use of data stores is to evaluate specific or "narrow" queries on a large number of items, e.g., a database of items, where, for many items in the database, the system can extract out a few field values, then aggregate all of the values into a result. Traditional row-oriented data stores can serve this use case correctly, but very slowly, because the system fetches additional, extraneous field values from storage. A common alternative is to use a column-oriented data store, which stores the values of each field in separate data structures, to attempt to improve the efficiency of query processing by improving the relevance of the data fetched from storage. While the column-oriented approach may sometimes speed up operations, it comes at the cost of scaling poorly when the dataset becomes complex.

Accordingly, there is a need to provide a database structure to efficiently index, store, and retrieve data.

BRIEF SUMMARY

Embodiments of the present disclosure introduce a novel approach that solves problems associated with managing large and complex data structures, especially in column-oriented data stores and inverted indexes, using pluggable structure-preserving dimensionality reducers and set intersection primitives, to accelerate queries on datasets that exhibit any combination of cardinality, dimensionality, sparsity, hierarchical structure, relational structure, or schemalessness.

Embodiments of the present disclosure are directed to systems and methods for managing a database. In one or more examples, the system can be configured to perform a method. For example, the system can obtain input data comprising one or more data entries. In one or more examples, each data entry can include one or more data items and each data item can include a field name and a field value. In one or more examples, the system can generate a key-value set for each data item of a plurality of data items in the one or more data entries to obtain a plurality of key-value sets. In one or more examples, each key-value set for a respective data item can include at least a first key element comprising the field name of the respective data item and a second key element comprising the field value of the respective data item. In one or more examples, the system can sort the plurality of key-value sets based on first key elements of the plurality of key-value sets. In one or more examples, the system can store the sorted plurality of key-value sets in the database. In one or more examples, the system can receive a query indicative of at least one of a field name or a field value. In one or more examples, the system can match the query to one or more key-value sets of the sorted plurality of key-value sets. In one or more examples, the system can retrieve one or more key elements corresponding to the matched key-value sets. In one or more examples, the system can generate an output based on the retrieved key elements sets. In one or more examples, the system can display, on a display, the output.

In some embodiments, the one or more data entries can include a first data entry comprising a first data item and a second data item, wherein the first data item is an identifier item, the identifier item comprising an identifier field and an identifier value. In such embodiments, obtaining the plurality of key-value sets can comprise obtaining a key-value set for the second data item by assigning a field name of the second data item as a first key element of the key-value set for the second data item, assigning a field value of the second data item as a second key element of the key-value set for the second data item, and assigning the identifier value of the first data item as a third key element of the key-value set for the second data item.

In some embodiments, matching the query to one or more key-value sets comprises matching the query with any key element of the one or more key-value sets. In some embodiments, the query can include a range query.

In some embodiments, a data item of the plurality of data items can include a text entry. In such embodiments the system can pre-process, before generating the plurality of key-value sets, the data item by tokenizing the text entry into a plurality of n-grams. In such embodiments, the plurality of n-grams comprises a plurality of trigrams.

In some embodiments, the plurality of key-value sets can be stored in the database as a one-dimensional list. In some embodiments, retrieving the matched key-value sets is performed without accessing a metadata table.

In some embodiments, the system can determine a key-value set schema based on the input data. In such embodiments, determining the key-value set schema can include analyzing the input data to identify a predefined type of field and determining the key-value set schema based on whether the predefined type of field is present. In such embodiments, the predefined type of field can correspond to an identifier field. In some embodiments where the system determines a key-value set schema, the system can receive a user input and determine the key-value set schema based on the user input.

In some embodiments, generating the output comprises averaging, summing, or a combination thereof.

In some embodiments, the system can further obtain a user input indicative of an addition of a new data item to the plurality of data items. In such embodiments, the system can generate a new key-value set based on the new data item and retrieve a key-value map corresponding to the sorted plurality of key-value sets in the database. The system can further add the new key-value set to the key-value map, sort the key-value map to generate an updated key-value map, and store the updated key-value map.

In some embodiments, the system can obtain a user input indicative of an update to a data item of the plurality of data items, the data item corresponding to a stored key-value set, retrieve the stored key-value set, delete the stored key-value set, and generate a new key-value set based on the user input. The system can further retrieve a key-value map corresponding to the sorted plurality of key-value sets in the database, add the new key-value set to the key-value map, sort the key-value map to generate an updated key-value map, and store the updated key-value map.

Embodiments of the present disclosure can further include a system for managing a database. In one or more examples, the system can include one or more processors, a memory; and one or more programs, wherein the one or more programs are stored in the memory and configured to be executed by the one or more processors. In one or more examples, the one or more programs including instructions for obtaining input data comprising one or more data entries, where each data entry comprises one or more data items and each data item comprises a field name and a field value. In one or more examples the instructions can further comprise generating a key-value set for each data item of a plurality of data items in the one or more data entries to obtain a plurality of key-value sets. In some examples, each key-value set for a respective data item can include at least a first key element comprising the field name of the respective data item and a second key element comprising the field value of the respective data item. In one or more examples the instructions can further comprise sorting the plurality of key-value sets based on first key elements of the plurality of key-value sets. In one or more examples the instructions can further comprise storing the sorted plurality of key-value sets in the database. In one or more examples the instructions can further comprise receiving a query indicative of at least one of a field name or a field value. In one or more examples the instructions can further comprise matching the query to one or more key-value sets of the sorted plurality of key-value sets. In one or more examples the instructions can further comprise retrieving one or more key elements corresponding to the matched key-value sets. In one or more examples the instructions can further comprise generating an output based on the retrieved key elements sets. In one or more examples the instructions can further comprise displaying, on a display, the output.

Embodiments of the present disclosure can further include a non-transitory computer-readable storage medium storing one or more programs, the one or more programs comprising instructions, which when executed by one or more processors of one or more electronic devices, cause the electronic devices to obtain input data comprising one or more data entries. In one or more examples, each data entry can include one or more data items and each data item can include a field name and a field value. The instructions can further cause the electronic devices to generate a key-value set for each data item of a plurality of data items in the one or more data entries to obtain a plurality of key-value sets. In one or more examples, each key-value set for a respective data item can include at least a first key element comprising the field name of the respective data item and a second key element comprising the field value of the respective data item. The instructions can further cause the electronic devices to sort the plurality of key-value sets based on first key elements of the plurality of key-value sets. The instructions can further cause the electronic devices to store the sorted plurality of key-value sets in the database. The instructions can further cause the electronic devices to receive a query indicative of at least one of a field name or a field value. The instructions can further cause the electronic devices to match the query to one or more key-value sets of the sorted plurality of key-value sets. The instructions can further cause the electronic devices to retrieve one or more key elements corresponding to the matched key-value sets. The instructions can further cause the electronic devices to generate an output based on the retrieved key elements sets. The instructions can further cause the electronic devices to display, on a display, the output.

DESCRIPTION OF THE FIGURES

FIGS. 1A-1C illustrate an exemplary dataset and storage techniques, in accordance with some embodiments of this disclosure.

FIGS. 3A-3B illustrate an exemplary dataset and storage technique, in accordance with some embodiments of this disclosure.

FIGS. 4A-4D illustrate an exemplary dataset and storage techniques, in accordance with some embodiments of this disclosure.

FIGS. 5A-5D illustrate an exemplary dataset and storage technique, in accordance with some embodiments of this disclosure.

FIGS. 6A-6C illustrate an exemplary dataset and storage technique, in accordance with some embodiments of this disclosure.

FIGS. 7A-7C illustrate an exemplary dataset and storage technique, in accordance with some embodiments of this disclosure.

FIGS. 8A-8C illustrate an exemplary dataset and storage techniques, in accordance with some embodiments of this disclosure.

DETAILED DESCRIPTION

Figure 2:
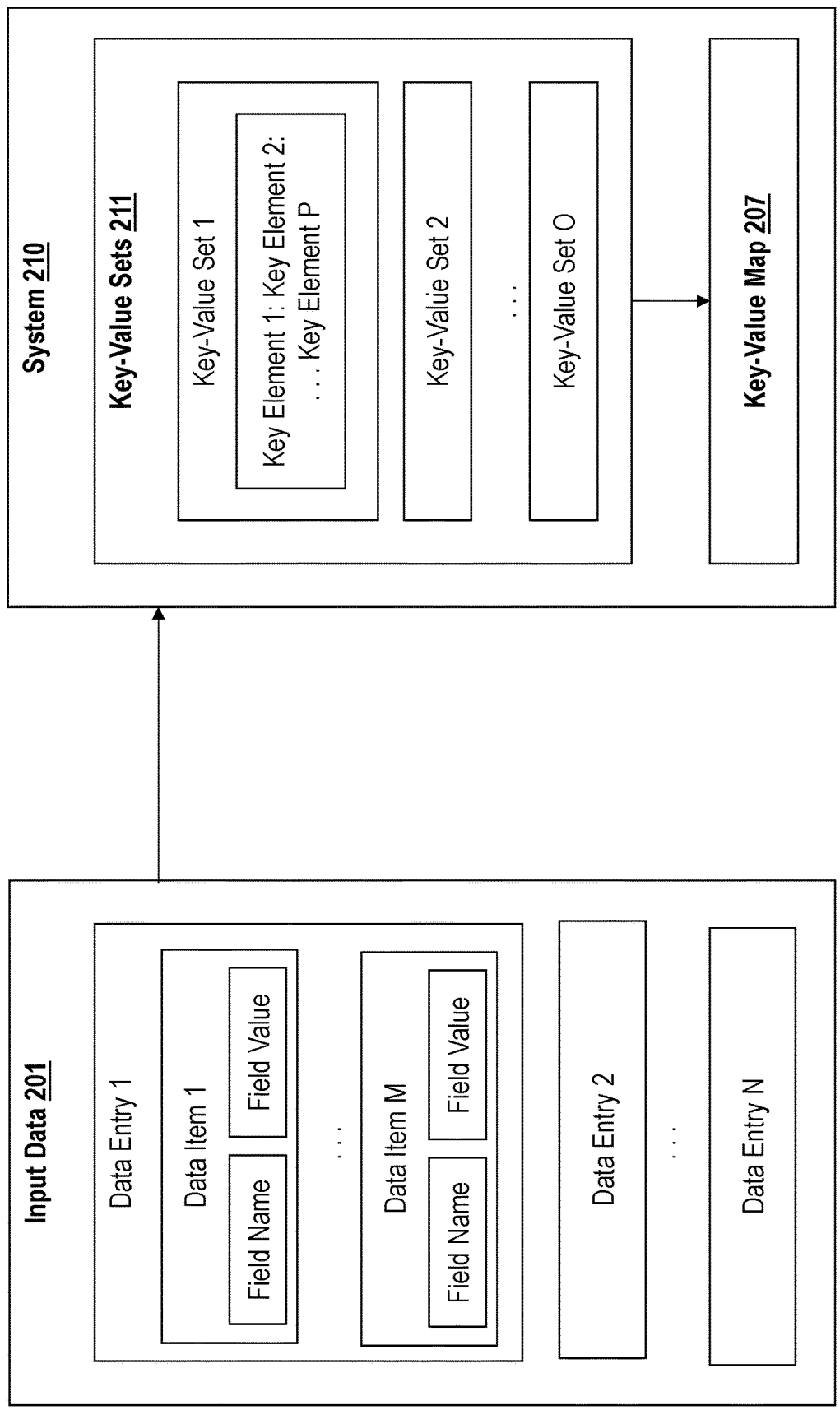
FIG. 2 illustrates an exemplary process for indexing and storing data, in accordance with some embodiments of this disclosure.

Recent years have seen an explosion in the production and collection of data. The data collected can produce relatively large and complex data stores that consume a significant amount of storage. Moreover, users often access the data via queries to identify data and/or process the data to produce various statistics and metrics. However, as the volume and/or complexity of data increases, accessing the data to perform such queries can result in slow searches that consume processing power.

For example, one use of data stores is to evaluate specific or "narrow" queries on a large number of items, e.g., a database of items, where, for many items in the database, the system can extract out a few field values, then aggregate all of the values into a result. Traditional row-oriented data stores can serve this use case correctly, but very slowly, because the system fetches additional, extraneous field values from storage. A common alternative is to use a column-oriented data store, which stores the values of each field in separate data structures, to attempt to improve the efficiency of query processing by improving the relevance of the data fetched from storage. While the column-oriented approach may sometimes speed up operations, it comes at the cost of scaling poorly when the dataset becomes complex.

FIGS. 1A-1C illustrate the differences between raw data and row and column storage techniques, in accordance with some embodiments. FIG. 1A illustrates exemplary raw data 101. In one or more examples, the raw data 101 can correspond to data presented in a table, e.g., Table 1. As shown in the figure, the raw data 101 may include three data entries 121. Each data entry can include one or more data items such as 123 and 129, where each data item can further include a field name 125 and a corresponding field value 127. In one or more examples, at least one of the data items in the data entry can be an identifier item 123, where the field name corresponds to the identifier field and the field value corresponds to the identifier value.

TABLE 1

| id | n | name | timeout |
|----|-----|------|---------|
| 0  | 0   | a    |         |
| 1  | 100 | b    | 3       |
| 2  | 200 | c    |         |

FIG. 1B illustrates exemplary row oriented storage 103 of the raw data 101. As shown in the figure, each data entry is stored in a row-oriented representation, where the values of the same field are stored separately. Conceptually, the row oriented storage 103 can map from row identifiers, "id": "0", "id": "1", "id": "2") to the other data items included in the same row. For example, "id": "0" can be used to map to "n": 0 and "name": "a".

FIG. 1C illustrates exemplary column oriented storage 105 of the raw data 101. A column-oriented data store (such as a metrics or analytics database) would store the items in a column-oriented representation, where the values of the same field are stored together. Conceptually, the column-oriented storage 105 can map the field names to the set of field values that exist in that field, across all data items. For example, the "name" field value is stored with ["a", "b", "c"].

To illustrate the problems that arise with traditional data storage methods, e.g., row-oriented and column-oriented data storage, consider the following query where a user would like to take the average of the values associated with the "n" field. For example, to complete this query, the following expression could be executed SELECT SUM(n)/COUNT(n) FROM Table_1. This expression calculates the sum of the values in the n column, then divides that sum by the count of rows in the table.

A row-oriented data store would load and evaluate each row to answer this query. As a consequence, data is fetched from storage that is not relevant. In the example above, all three rows would be fetched from storage, each row containing the fields "id", "n", "name", and "timeout". But, only the "n" field's values would be extracted and evaluated. Accordingly, this query has a data fetch efficiency of 25%, because of the data fetched, only one of four fields were relevant to query processing.

In contrast, a column-oriented data store would be able to fetch just the values of the relevant field. But this comes at the expense of interacting with a second data structure to access the location of the values. For example, the data store would first access a metadata store that maps the field names to arrays of the values. Next, the data store would access the array of values and perform processing. Thus, according to the this example, the data store would perform two internal lookup operations: (1) a read of the metadata store, which takes as input the field name "n" and returns an internal location at which to fetch the column-oriented data and (2) a read of the column store, which takes as input an internal location, and produces the values [0, 100, 200].

If accessing the metadata store has negligible overhead, then the data fetch efficiency is 100%, because the data fetched equals the data processed. However, in practice, when using traditional column-oriented data stores, a problem arises: as the complexity of the dataset increases, the complexity of the metadata structure also increases. In this example, such a problem would arise if the number of fields across all the items grew in number, which would cause the number of field names in the metadata structure to increase. As the number of fields increases, storing and accessing the metadata can introduce significant overhead into the system.

The scenarios in which the metadata structure becomes complex include any of the following: hyperdimensionality, hypercardinality, sparsity, and schemaless. As used herein, the issues of hyperdimensionality, hypercardinality, sparsity, and/or schemaless discussed the above, may be referred to as "Metadata Storage Scaling Problems".

A hyperdimensional dataset can include many (perhaps trillions or more) different fields. Each field contains one or more values that, across the dataset, can be stored in columns. The metadata structure contains metadata for each field in the dataset. For example, if the dataset is very "wide", then it may have trillions of different fields. The metadata structure can store information about each of these trillions of fields, so that queries can identify and fetch the relevant arrays of values. Storing metadata for trillions of fields may take petabytes of storage; at such a scale, sophisticated techniques may be required to manage such complex metadata.

A hypercardinal dataset can include one or more fields containing many (perhaps trillions or more) unique values across many different items. In some systems, such as search engines, the metadata store contains not just field names, but also field values. For example, the metadata store can store the columns as inverted indices that can provide lookups on term-document co-occurrences. In such an arrangement, while the number of fields may be low, the number of values are large. As a result, because all the values are incorporated into the metadata store, the metadata store is complex and difficult to manage. Thus, the cardinality problem of the data has turned into a dimensionality problem of the metadata.

A sparse dataset may include fields that do not occur in all data entries. That is, fields may be occasionally or frequently empty across different data entries. For example, consider a raw dataset including trillions of entries, each with a field name that only ever occurs once in the dataset (which would be the case when using a universally-unique identifier as a field name). In this situation, the metadata store must store information about each field, yet that field may contain an array with only one value. As a result, the metadata store is in fact larger in storage than the data store. As a consequence, the metadata store may become the bottleneck during data store and read operations, and there may be no opportunities to achieve data compression in storage, because the values are not co-located.

A schemaless dataset may include field names and types that are unknown and may change at any time. For example, consider a dataset where new field names are encountered often. Each occurrence of a new field requires a modification to the metadata store. If every item written to the data store includes a new field, then the metadata store must be modified at the same time as the column-oriented store, which adds significant overhead to the overall system.

Embodiments of the present disclosure provide systems and methods to address the metadata storage scaling problems by removing the need to maintain a metadata store altogether. In one or more examples, embodiments of the present disclosure introduces a new approach that solves problems associated with managing and searching large and complex data structures, especially in column-oriented data stores and inverted indexes, using pluggable structure-preserving dimensionality reducers and set intersection primitives, to accelerate queries on datasets that exhibit any combination of cardinality, dimensionality, sparsity, hierarchical structure, relational structure, or schemalessness.

The techniques described herein improve the functioning of a computer or computer system, for example, by increasing the throughput and lowering the latency of ingestion pipelines in databases. Embodiments according to the present disclosure achieve this by, for example, eliminating the need for an internal auxiliary datastore to manage the metadata for columns and schema information in a database.

In one or more embodiments, the functioning of a computer system can be improved by increasing the throughput and lowering the latency of indexing systems in databases. Embodiments according to the present disclosure achieve this by, for example, storing values in a flat ordered key-value, which can have excellent and predictable runtime performance.

In one or more embodiments, the functioning of a computer system can be improved by increasing the utilization of storage space in databases. Embodiments according to the present disclosure achieve this by, for example, packing metadata and data together in a unified representation, thereby eliminating the need to store internal storage identifiers to traverse multiple data structures.

In one or more embodiments, the functioning of a computer system can be improved by increasing the throughput and lowering the latency of query processing in databases. Embodiments according to the present disclosure achieve this by, for example, packing sparse data closer together in storage, and enabling the use of more scalable data structures to store both metadata and data in a unified key-value set representation.

In one or more embodiments, the functioning of a computer system can be improved by improving the flexibility of a database to ingest, store, index, and query data that has unknown or adversarial structure.

In one or more embodiments, the functioning of a computer system can be improved by improving the stability and performance of a system that can automatically ingest, store, index, and query data that has any combination of cardinality, dimensionality, sparsity, structure, or schemalessness, without human intervention.

In one or more embodiments, the functioning of a computer system can be improved by reducing the memory and storage required by a database.

In one or more embodiments, the functioning of a computer system can be improved by improving the speed and storage utilization of a database to ingest, store, index, and query data with large numbers of dimensions (billions, trillions, or more).

In one or more embodiments, the functioning of a computer system can be improved by improving the speed and storage utilization of a database to ingest, store, index, and query data with large numbers of unique values in columns (billions, trillions, or more).

In one or more embodiments, the functioning of a computer system can be improved by improving the speed and storage utilization of a database to ingest, store, index, and query data that exhibits sparsity (many missing values).

In one or more embodiments, the functioning of a computer system can be improved by improving the speed and storage utilization of a database to ingest, store, index, and query data that exhibits schemalessness, especially in scenarios where the dataset structure may be arbitrary.

In one or more embodiments, the functioning of a computer system can be improved by improving system resilience when storing, indexing, and querying data that has extremely complex structure, such as completely random data or adversarial data. For example, embodiments according to the present disclosure can be used to store all metadata and data in a simple, unified representation that is simpler than a traditional technique.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of the present disclosure provide systems and methods for managing a database and providing data retrieval. In one or more examples, embodiments of the present disclosure can address the aforementioned metadata storage scaling problems by removing the need to maintain a metadata store altogether. In other words, the data can be stored and retrieved without accessing a metadata store. In one or more examples, systems and methods according to this disclosure can store input data in a key-value map. The key-value map includes a plurality of ordered key-value sets. The key-value map stores the input data with information that would traditionally be stored in a separate metadata store.

FIG. 2 illustrates exemplary process 200 for generating a key-value map according to embodiments of the present disclosure. In one or more examples, the system 210 can receive input data 201. The system 210 can generate a plurality of key-value sets 211 based on the input data 201. The system can then sort the plurality of key-value sets 211 to produce a key-value map 207. The system can then receive one or more queries to run on the key-value map 207. Based on the one or more queries, the system can retrieve one or more key-value sets responsive to the query.

As shown in the figure, the input data 201 can include one or more data entries. For example, input data 201 includes data entry 1, data entry 2, to data entry N. In one or more examples, each data entry can include one or more data items. For example, data entry 1 can include data item 1 to data item M. In one or more examples, each data item can include a field name and a field value. In one or more examples, each data item can be associated with a plurality of properties or attributes, e.g., data type. In one or more examples at least one data item in a data entry may correspond to an identifier for the data entry (e.g., an identifier to identify data entry 1). Although data entry 2 through data entry N are not shown as having individual data items, a skilled artisan will understand that each of the data entries can include one or more data items. Further, a skilled artisan will understand that the number of data entries or data items is not intended to limit the scope of the present disclosure.

The system 210 can receive the input data 201. As noted above, the system 210 can generate a plurality of key-value sets 211 based on the input data 201. As shown in the figure, each key value set can include a plurality of key elements. For example, key-value set 1 can include key element 1, key element 2, to key element P. In one or more examples, the key-value elements can be based on the field name, field value, or attributes of the data items. For example, key element 1 can be based on the field name of data item 1 and key element 2 can be based on the field value of data item 1. In one or more examples, a key element, (e.g., key element P) can be based on an attribute of the data item (e.g., data type). In one or more examples, a key element (e.g., key element P) can be based on an identifier of the data entry. In one or more examples, each of the key elements are appended to each other to generate the key-value set. The number of key-value sets and/or key elements is not intended to limit the scope of the present disclosure.

In one or more examples, the key-value set generation process can be application specific. For example, an application may wish to map data items from input data to a key-value set in a one-to-one relationship (e.g., each data item corresponds to a key-value set). As another example, each non-identifier data entry can be mapped to at least one key-value set. As another example, the system can treat arrays as "sets" that contain elements without any consideration of order. As another example, the system can treat arrays as ordered vectors that contain elements in particular positions. As another example, the system can use both representations simultaneously. Specific examples of generating key-value sets will be discussed in greater below.

Once the plurality of key-value sets are generated, the system can rank or sort the key-value sets 211 to produce a key-value map 207. As used herein, a key-value map or key-value store can refer to a plurality of ordered key-values. In one or more examples, the function that provides a comparison between keys may be a sort order for one-dimensional keys, a distance function for multi-dimensional keys, and the like. For example, one-dimensional keys can be stored in data structures like B-Trees, and multidimensional keys can be stored in a kd-tree. In one or more examples, particularly ones dealing with large and/or complex datasets, may use, but is not limited to, B-Trees or LSM Trees, to store and query the key-value sets. The specific sorting functions are not intended to limit the scope of the disclosure.

The system can run one or more queries on the key-value map 207 to identify and/or retrieve data for performing one or more database operations and/or further processing. The query can be based on one or more of a field name, field value, properties of the data, identifiers, and the like. The query can search among the keys of the key-value set to retrieve the value and/or the key-value set itself.

One of the advantages of embodiments of the present disclosure of relates to the flexibility of using various key elements in the key-value set based on the query to be executed on the key-value map. In one or more examples, the physical representation of a "key" and a "value" in the key-value set may be application-dependent. For example, a database could include a key-value set corresponding to {map:c:number:42:1}, where "c" corresponds to a field name, "42" corresponds to a field value, "map" and "number" correspond to properties (e.g., data types), and "1" corresponds to the identifier value for the data entry. In this example, the key-value set includes five key elements. In one or more examples, the key-value set can be stored in the database as a string.

Based on this example, if the system were to receive a query to identify data items in the database that include field c, then the system could run a range query (e.g., map:c:*) where the map:c portion of the key-value set would be treated as the key and the number:42:1 portion would be treated as the value. In one or more examples, the query can be understood to include query term, where the "map:c" portion of the query map:c:* is the query term. The value may be subject to a secondary part of the query processing. As another example, if the system were to receive a query to identify data items that include c values corresponding to 42, the system could run a range query (e.g., map:c:number: 42:*), where the map:c:number:42 portion of the key-value set could be treated as the key, while the 1 portion could be treated as the value. In this example, map:c:number:42 would correspond to the query term. In this manner, a number of queries with different query terms can be run based on the structure of the same key-value set.

In one or more examples, the query can include set intersection logic. During query processing with set intersection logic, the temporary sets of values to intersect may be very large (depending on the results of the range lookups). In these situations, the aggregate size may be too large to fit in fast storage (such as memory), which slows down the set intersection processing. When intersecting sets of values, the behavior is analogous to a join in a relational database. Traditional techniques to handle joins in relational databases are also useful for embodiments of the present disclosure (e.g., spilling to intermediate storage, sorting key-value sets by their values, hashing the values, and the like to find the set intersection).

The following examples relate to potential applications of the key-value map 207. A skilled artisan will understand that database management techniques according to embodiments of the present disclosure is not intended to be limited by the examples discussed below.

Column-Oriented Data Stores

FIG. 3A illustrates exemplary raw data or input data 301. As shown in the figure input data 301 can correspond to input data 101. Like input data 101, input data 301 can include one or more data entries. Each data entry can include one or more data items, where each data item can further include a field name and a corresponding field value. In one or more examples, each data entry can include an identifier item (e.g., id).

FIG. 3B illustrates key-value map 307 of input data 301 according to embodiments of the present disclosure. According to embodiment of the present disclosure, the input data 301 is stored in a "flattened" (e.g., one-dimensional) form comprising a plurality of key-value pairs or key-value sets. As shown in key-value map 307, each key-value set includes one or more key element. For example, the field name of a data item and the corresponding field value can correspond to the key elements. In one or more examples, the key-value sets are sortable and can be ordered and stored according to a sorting function. For example, the key-value sets of key-value map 307 are sorted in alphabetical order. A skilled artisan will understand that the key-value sets can be sorted according to any number of implementations of a sorted set data structure known in the art and that the sorting functions are not intended to limit the scope of this disclosure.

In one or more examples, the system can evaluate queries based on the sorted key-value sets. In one or more examples, the query can be performed on any of the key elements, e.g., the field name and/or field value. As an example, the system can receive and evaluate a range query on the sorted key-value sets to determine an average of n. To evaluate the query to take an average of n (e.g., SELECT SUM(n)/COUNT(n) FROM Table_1), embodiments of the present disclosure can evaluate a query of the form n:*, where n corresponds to the query term and * is a wildcard to obtain a lazy iterator over the key-value sets that include n (e.g., [n:0, n:100, n:200]). For each key-value set in the lazy iterator, the system can extract the field value and combine the field value with a running sum and count. Table 2 illustrates an example of the extracted values, running sum, and counts. The average can then be computed by calculating 300/3 to obtain the final result 3. Accordingly, as shown in this example, embodiments of the present disclosure can evaluate a query without accessing a metadata store.

TABLE 2

| n | SUM(n) | COUNT(n) |
|---|--------|----------|
|   | 0      | 0        |
| 0 | 0      | 1        |
| 100 | 100  | 2        |
| 200 | 300  | 3        |

As illustrated by this example, the fetch efficiency is nearly 100%. That is, every fetched datum was relevant to query processing and only the negligible overhead of searching in a sorted set was required to access the key-value sets in the query range. For example, a binary search tree would require only log(number of keys) lookups to locate the results needed for the query. In one or more examples, those results would then be contiguous on disk.

In this manner, embodiments of the present disclosure provide a database that includes an ordered key-value map including a plurality of key-value set representations of the data items. The key-value sets contain the information that would traditionally be included in the metadata stores and column-oriented storage. In other words, each key-value set unifies the storage of data corresponding to the data item and metadata. In one or more examples, the key-value sets may be stored in a single data structure, e.g., such as a binary search tree, BTree, LSM Tree, or in-memory vector. In one or more examples, blocks of key-value sets in the key-based data structure can be compressed, to provide compression benefits similar to that of traditional column-oriented compression.

Accordingly, embodiments of the present disclosure simplify the implementation of a columnar data store, by removing the need to manage a separate metadata store altogether. For example, regarding the metadata storage scaling Problems, embodiments of the present disclosure address the issues of hyperdimensionality, hypercardinality, sparsity, and schemaless data that arise with a complex metadata structure.

For example, embodiments of the present disclosure address hyperdimensionality because the field names are stored with their values in a single representation so the metadata storage structures are no longer needed. For example, a database including a key-value map according to embodiments of the present disclosure can access a field's value with, e.g., a range query on the sorted key-value sets. As a result, the metadata store problems associated with hyperdimensionality are eliminated.

As another example, embodiments of the present disclosure address hypercardinality because the field values are stored with their field names in a single representation, so the metadata storage structures are no longer needed. In particular, the distinction between a field name and a field value is eliminated because both are stored together as separate key elements in the key-value set.

As another example, embodiments of the present disclosure address sparsity because the field values are stored in key-value sets that are stored co-located with other key-value sets, regardless of whether the key-value sets belong to the same field or not. As a result, the cost of accessing data items, e.g., field names and corresponding field values is reduced. For example, referring to input data 301, a traditional system would make two fetches to obtain the arrays for id and n. But embodiments of the present disclosure can obtain the arrays for id and n in one query, e.g., with the range lookup id:* . . . =n:*.

As another example, embodiments of the present disclosure address schemaless data because field names and types can be added, updated, or deleted without changing the dynamics of the database. For example, adding, deleting and/or updating a key-value set can be performed at the key-value set level without impacting other key-value sets included in the database. In contrast, a column-oriented store would need to allocate new contiguous arrays for values, and update the metadata store with the new field names and array storage locations.

Complex Datasets in Inverted Indexes and Tabular Data

Embodiments of the present disclosure can also address the problems associated with storing and accessing metadata for complex datasets in inverted indexes. Inverted index structures can be used to store a mapping of content (e.g., words or numbers) to the location of the content in a document or set of documents. Similar to column-oriented storage, inverted indexes encounter Metadata Storage Scaling Problems using the storage of field-values as metadata and the storage of document identifiers as arrays of values.

FIG. 4A illustrates exemplary input data 401 that can be stored using inverted index storage. As discussed above, the exemplary input data 401 can include one or more data entries. Each data entry can include one or more data items, where each data item can further include a field name and a corresponding field value. In one or more examples, each data entry can include an identifier item (e.g., id).

FIG. 4B illustrates exemplary inverted index 403 corresponding to the input data 401. As shown in the figure, the inverted index 403 provides a mapping from a field name (e.g., reading) to a field value (e.g., 99) to a document id (e.g., 10, 20). Using this structure, a system can execute queries that provide the document identifiers given various predicates (e.g., queries corresponding to a field name). For example, referring to inverted index 403, the result for the query where reading is equal to 99 and type is equal to z, (e.g., reading==99 AND type=="z") is the set of document identifiers [20].

Traditionally, inverted indexes are often stored in a column-oriented representation. FIG. 4C illustrates exemplary column storage 405 of the inverted index 403. The field names and field values can be stored in a metadata store, and the document identifiers can be stored as arrays of values. In one or more examples, an implementation can store the field name and value pairs in a BTree or finite-state transducer, and store the document identifiers in separate arrays. Note that the representation of the input data 401—as two levels (e.g., the column storage and the metadata store)—corresponds to the column-oriented data storage scenario described above. For example, each field name-value pair in the mapping is stored in the metadata store, and each array of document identifiers is stored in the data store. Thus, the data can be stored at two locations and the system has to access both locations in order to access the data.

In contrast, embodiments of the present disclosure provide advantages over the traditional data storage techniques by storing data associated with the metadata store and the column storage together in a key-value set. FIG. 4D illustrates exemplary key-value map 407 according to embodiments of the present disclosure. As shown in the figure, the key-value map includes a plurality of key-value sets. Each key-value set can include a plurality of key elements that are appended to each other. As shown in the figure, the key elements can correspond to the field name, field value, and identifier (e.g., document id).

As discussed above, inverted indexing can be mapped to a column-oriented storage scenario. Embodiments of the present disclosure provide techniques to solve problems of dimensionality, cardinality, sparsity, and schemalessness in column-oriented storage scenarios, as discussed in the previous section. Accordingly, embodiments of the present disclosure address the Metadata Storage Scaling Problems associated with storing data from an inverted index.

A skilled artisan would understand that the techniques described in this section can be used to create inverted indexes of tabular data. Further, a skilled artisan would understand that the techniques discussed with respect to inverted indexes may be applied to forward indexes, which are commonly used to store mapping from documents to words.

Search Engines

Embodiments of the present disclosure also provide solutions for solving the metadata storage scaling problems associated with search engines. Search engines can be used to query for documents that do or do not contain user-supplied tokens. Traditionally, token-document relationships are stored in a column-major matrix, which can act as an inverted index. In the column-major matrix, each column can represent a token, each row can represent a document, and the cells can correspond to booleans that indicate whether a document contains a token. While this data structure may be adequate for small numbers of tokens or documents, as the dataset complexity grows, the overhead of accessing columnar data grows, which then needs to be solved by (in effect) using another database to speed up querying the columnar metadata.

In contrast to traditional search engine inverted indexes, embodiments of the present disclosure can be used to store the aforementioned matrix using a lower-dimensional representation, thereby eliminating the auxiliary data structures needed to query columnar metadata.

For example, consider creating a search engine for a dataset where each data entry contains a timestamp field and a text field. FIG. 5A illustrates exemplary input data 501 where each data entry contains a timestamp field and a text field. In one or more examples, a search engine ingestion pipeline can preprocess the input data 501 by converting the timestamp into a numeric field (such as an integer representing the number of seconds since the start of the UNIX epoch), and tokenizing the text field into a set of case-insensitive n-grams (e.g., a grouping of n consecutive units including letters, spaces, symbols, etc.). The scope of this disclosure is not intended to be limited by the type or pre-processing.

FIG. 5B illustrates processed data 511. As shown in the figure, the processed data 511 includes data entries where the date has been converted into a number and the text has been converted into a set of case-insensitive trigrams.

FIG. 5C illustrates exemplary unsorted key-value sets based on processed data 511, according to embodiments of the present disclosure. As shown in the figure, the key-value sets can include a plurality of key elements corresponding to the field name, field value, and data entry identifier (e.g., document identifier). In one or more examples, the key-value sets can be a sortable bytestrings, where the key-value set includes key elements corresponding to the field name and the field value of non-identifier data items as well as the corresponding identifier value (e.g., document id) for the data entry (e.g., document). FIG. 5D illustrates exemplary key-value map 507 based on the unsorted keys 509.

In one or more examples, a query can be executed to identify one or more documents that contain specified predicates. For example, the system can receive a query to identify documents that contain the trigram "fox" but not the trigram "red". Based on this query, the system can perform a first search for key-value sets having a key element equal to the text "fox" (e.g., with a query term text:"fox"). This query can identify the following key-value sets: {text: "fox":0} and {text:"fox":1}. The system can further perform a second search for key-value sets having a key element equal to the text "red" (e.g., with a query term text:"red"). This query can identify the following key-value set {text: "red":1}. The system can then remove the results of the second search from the results of the first search, which provides the following key-value set {text:"fox":0}. The identifier value, 0, can then be extracted from the key-value set and the corresponding document can be fetched from storage.

The preceding example demonstrates how any number of tokens can be flattened into one key space. Because the resulting dataset of key-value sets can be stored in a one-dimensional data store, embodiments of the present disclosure may eliminate the need for any auxiliary data structures to facilitate set intersection queries in search engines.

As discussed above, because embodiments of the present disclosure unify the representation of both the document identifier (e.g., identifier values) and column names (e.g., non-identifier field names such as text or timestamp), the problems of cardinality, dimensionality, and sparsity are solved. Additionally, embodiments of the present disclosure solve the inverted indexing problem for items that do not have a known structure (i.e. schemaless), because the transformation from data entry to key-value set is syntactic in nature. In one or more examples, the transformation from data entry to key-value set can be applied, but is not limited, to any JSON document.

In one or more examples, embodiments of the present disclosure address database issues associated with sparsity that can arise with search engines. For example, by flattening column names (e.g., field names) into the same keyspace as values, and document identifiers, embodiments of the present disclosure eliminates the need to store metadata providing lookups into sparse dimensions. This benefit becomes increasingly important in the modern era of complex datasets that may contain trillions of sparse dimensions.

Analytics Databases

Embodiments of the present disclosure can also improve the management of data associated with analytics databases.

FIG. 6A illustrates exemplary input data 601 for an analytics database. As shown in the figure, the input data 601 includes a plurality of data entries (e.g., 0, 1, 2), where each data entry includes one or more data items (e.g., id, environment, timestamp, a, b, and c).

FIG. 6B illustrates exemplary unsorted key-value sets according to embodiments of the present disclosure. As shown in the figure, the key-value sets can include a plurality of key elements including a field name, a field value, and a data entry identifier value. In one or more examples, the key-value sets can be sortable bytestrings. FIG. 6C illustrates an exemplary sorted key-value map 607 based on the unsorted key-value sets 609. As shown in the figure, the numeric key elements can be ordered according to their numeric value.

In one or more examples, the system can receive a query to identify one or more data entries. For example, the query may be used to identify data entries having an "a" field with a value greater than 0.01, and an "environment" field with a value of "production". The system can accordingly, search for key-value sets having a key greater than or equal to a:0.01, which provides the following key-value sets: {a:0.1: 0}, {a:0.3:1}. The system can additionally search for key-value sets having a key equal to environment:production, which provides the following key-value sets: {environment: production:1}, {environment:production:2}. The system can then extract the values from each of the key-value sets, which provides the following sets of values: {0, 1} for the first search and {1, 2} for the second search. Because the query relates to data entries that include both search terms, the system can intersect the values from each of the sets of values, giving: {1}. The system can then fetch the corresponding data entry from auxiliary storage. In one or more examples, the system can then perform one or more database operations on the fetched data entry.

Schemaless Data, Including Hierarchical and Relational Data

Embodiments of the present disclosure can further be used to manage schemaless data, including hierarchical and relational data. Traditionally, items with an unknown structure can be organized as an inverted index. This can include data with arbitrary combinations of cardinality, dimensionality, hierarchical structure, relational structure, sparsity, or schemalessness. According to systems and methods of the present disclosure, such schemaless data can be mapped to a data structure comprising a plurality of key-value sets.

In one or more examples, embodiments of the present disclosure can receive a plurality of arbitrary documents (e.g., JSON documents) and generate a plurality of key-value sets based on the hierarchical structure included in the documents.

FIG. 7A illustrates exemplary input data 701 comprising a plurality of inverted indexed data entries corresponding to documents (e.g., 0, 1, 2, 4). The data entries can include various properties associated with the document (e.g., a, b, c, d, abc). As seen in the figures, the input data is schemaless—there is no consistent structure between the different data entries. Note also that the exemplary input data (e.g., JSON documents) are sparse, i.e., not all documents contain values for all columns.

FIG. 7B illustrates a plurality of unsorted key-value sets corresponding to inverted index 703. As shown in the figure, the key-value sets can be generated based on the properties of the documents and the corresponding values. In one or more examples, considering the inverted index 703 as a data tree, each key-value set can be determined by walking through the path for the data item with the lowest rank. For example, as seen in the input data 701, data item "b": "foo" is nested within "a" in document 0. As shown in the figure, this data item can be extracted as {map:a:map:b:string:foo: 0}. FIG. 7C illustrates exemplary key-value map based on the plurality of unsorted key-value sets 709.

The key-value sets 709 can address two issues associated schemaless data: 1) maintaining the hierarchical structure of the input data and 2) identifying different types of data within the input data. Regarding the hierarchical structure, as shown in the figure, the hierarchical structure can be inlined into the key-value sets such that information closer to the root of the document is stored closer to the left of the key. For example, in the first document, "b": "foo" is nested within "a." This structure is reflected in the key-value set by having "a" located to the left of "b:foo" (e.g., {map:a:map: b:stringfoo}). Additionally, a key-value set can identify the different types of data with the appropriate key element (e.g., map, string, array, number, etc.).

Embodiments of the present disclosure can be used to not only query values, but also information that would typically be stored as columnar metadata. In one or more examples, embodiments of the present disclosure can perform a query to find documents that have a field values a:b containing a value of type string. For example the system can search for key-value sets with key elements that include "a:map:b: string", this provides the following key-value sets: {map:a: map:b:string:bar:1}, {map:a:map:b:string:foo:0}. The system can then extract the values from each of the key-value sets, which provides {0, 1}. The documents corresponding to 0 and 1 can then be fetched from storage and the desired database operations can be performed on the data.

Accordingly, embodiments of the present disclosure can be used to query for arbitrary structure in scare and schemaless input data. In this manner, embodiments of the preset disclosure can generate a sorted key-value map for any syntactically-valid input data, regardless of cardinality, dimensionality, sparsity, schemalessness, or hierarchical structure.

Further, embodiments of the present disclosure provide benefits for reducing the amount storage space used to store the data and associated data structure. In a traditional system, when datasets exhibit sparsity, high-dimensionality, or high-cardinality, the overhead of metadata storage space usage can be significant. Embodiments of the present disclosure overcome this problem by relying on a low-dimensional data-structure comprising a plurality of key-value sets.

For example, traditional data storage architectures typically include two storage systems (e.g., metadata store and data store). FIG. 8A illustrates the metadata store 813 that contains the keys to be queried (e.g., bar, baz, foo), mapped to internal storage identifiers (e.g., 1234, 5678, 9012). The internal storage identifiers can point to the list of values for each key. FIG. 8B illustrates the data store 801 that includes the set of internal storage identifiers, mapped to the lists of values (e.g., [1], [100], [10000]). As shown in the figures, each key, is mapped to a single value. For example, each key points to a different internal storage identifier in the set {1234, 5678, 9012}, and each identifier points to a different list with the value.

The crux of the problem with traditional systems is that the space needed to store the internal identifiers can be as large, or larger than, the sets of values themselves. In the above example, consider the situation wherein each key is 64 bits in size, each internal identifier is 64 bits in size, and each value is also 64 bits in size. Accordingly, the storage of the identifiers is as much as the storage of the values.

Embodiments in accordance with the present disclosure, however can reduce, the storage requirements. FIG. 8C illustrates key-value map 807 according to embodiments of the present disclosure. As shown the key-value map 807 provides a data storage structure that eliminates the need for metadata storage—such as internal storage identifiers—thereby using much less space. Additionally, embodiments of the present disclosure enable data from different columns (e.g., corresponding to different filed names) to be co-located on disk, thereby leading to improved spatial locality and thereby improved compression rations.

Accordingly, embodiments of the present disclosure unifies inverted indexing for various data types, whether these data types exhibit hyper-dimensionality, hyper-cardinality, sparsity, hierarchical structure, relational structure, true schemalessness, or any combination thereof. Because embodiments of the present disclosure can be used to lower the dimensionality of the data, low-dimensional data structures (such as binary search trees) can be used to build a database for data with many dimensions. Conceptually, embodiments according to the present disclosure "flatten" the structure of items into a unified representation amenable to a unified lookup method.

Further, embodiments of the present disclosure address database issues associated with adversarial or random data. For example, embodiments of the present disclosure enable storage, indexing, and querying of arbitrary schemaless data, without configuration from a third-party (human or computer). In one or more examples, management of the sorted key-value data structure can be performed by a computer administrator or automatically. Therefore, embodiments of the present disclosure enable the ingestion, indexing, and serving of data that may be considered adversarial: arbitrarily large numbers of columns (hyper-dimensionality), arbitrary large numbers of values (hyper-cardinality), extreme sparsity (such as when a column and/or value only appears once in dataset), and inconsistent structure (schemalessness). In contrast, traditional systems quickly run into performance and stability problems when data is adversarial or random.

Further, embodiments of the present disclosure provide benefits for ingestion pipelines. For example, embodiments of the present disclosure simplify the management of data that exhibit high-cardinality, high-dimensionality, and schemalessness. According to embodiments of the present disclosure, such data may be ingested, indexed, and queried using a single ordered key-value data structure, such as a B-Tree. single ordered key-value data structure are operationally simple compared to other implementations that require the use of two data stores, e.g., one to manage metadata, and another to manage data (such as a Finite State Transducer for metadata, and columnar storage for the data). In this manner the key-value set data representation facilitates the use of simple and efficient data structures.

For example, to add a document to an inverted index using a traditional approach would require updating both the metadata and data stores. In contrast, according to embodiments of the present disclosure, only one storage system, e.g., the key-value set data structure, will be updated.

As another example, according to embodiments of the present disclosure, the ingestion process for a new data item, whether the new data item corresponds to a new field name or not, is the same. For example, new key-value set can be generated based on the new data item, and the new key-value set can be inserted into the ordered key-value map. In contrast, traditional methods require the system to update the metadata store with information about the column, as well as storing the new data.

In one or more examples, embodiments of the present disclosure can be used in a streaming fashion, by interleaving the process of updating items in the inverted index with the evaluation of queries.

In one or more examples, modifying key-value sets corresponding to an updated data item (e.g., updating key elements in the key-value set) can be accomplished by physical deletion or logical deletion. In one or more examples, the query terms generated from data entries may be trivial, such as when the queries are based on the identifier value of the data entry.

In one or more examples, the key elements generated from data entries and/or data items may be random, such as UUIDs, when the goal is to spread key-value sets evenly in a keyspace. In some embodiments, such randomization of the key-value sets may be useful for load-balancing in a distributed database.

In the key-value sets, the key elements may contain arbitrary inline data. In one or more examples, the system can store the identifier value of the data entry in a key element. In other examples, the system can store information such as the term frequency (used in BM25 relevancy ranking applications) or other data in the key elements (e.g., "fast fields").

In one or more examples the key-value sets (e.g., including the key elements) can be compressed using lossless or lossy techniques. In one or more examples, lossy approach could drop key-value sets during processing, to save space at the cost of introducing lookup errors.

In one or more examples, multiple key-value sets may be generated from a single value in a data item. For example, the system can support so-called "duck typing" by writing multiple equivalent key-values sets that contain different type signatures. For example, given the data entry {"id": 0, "a": true}, at least two key-value sets could be generated: {a:boolean:true:0} and {a:integer:1:0}. In one or more examples, to access the data item stored in a key-value map, a user may supply a query on either a boolean or an integer and retrieve the same results.

Figure 9A:
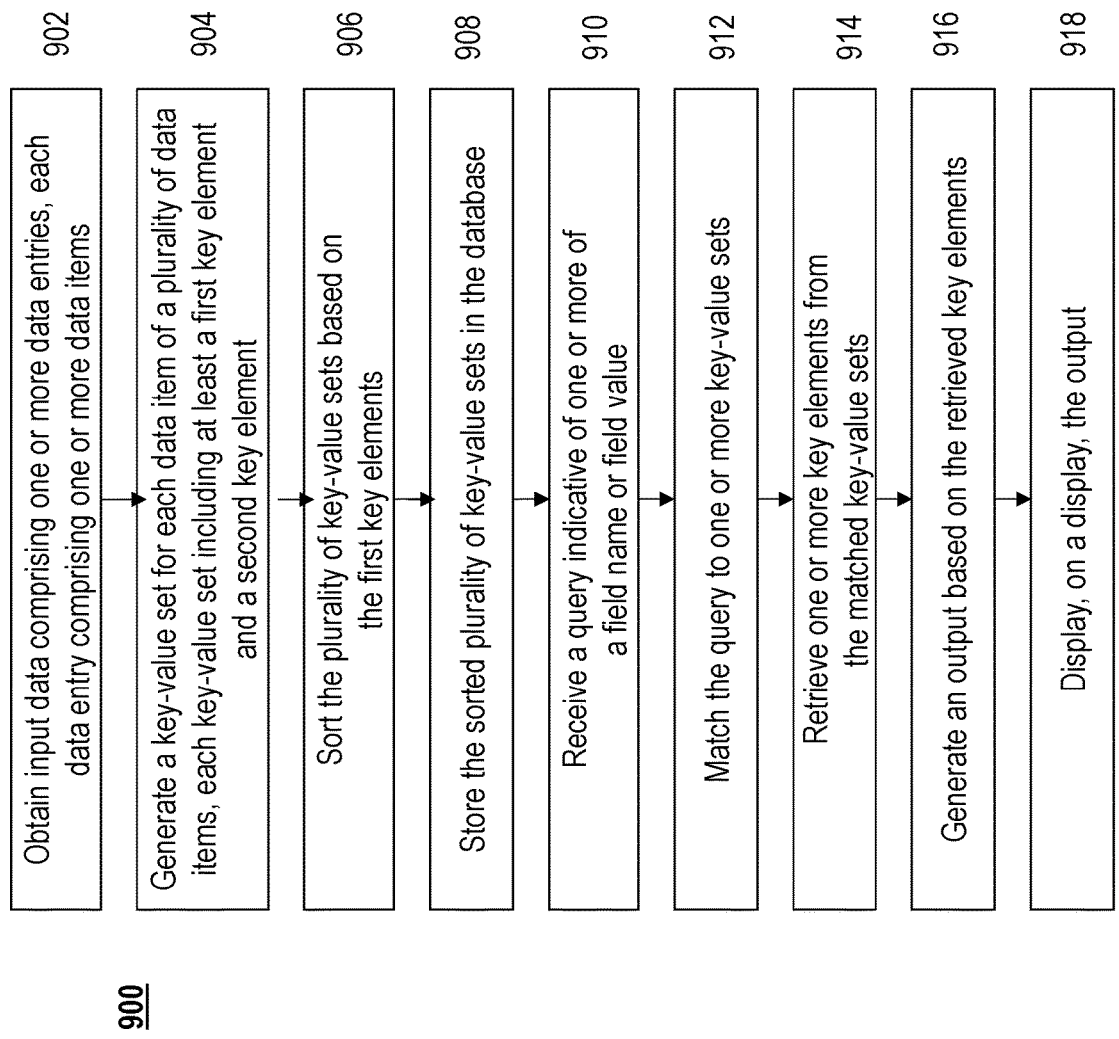
FIGS. 9A-9D illustrate exemplary processes for managing a database, in accordance with some embodiments of this disclosure.

FIG. 9A illustrates a flow chart of a process 900 for managing a database and/or providing data retrieval, according to embodiments of the present disclosure. The following description of process 900 will be described with reference to FIGS. 5A-5D to further clarify the process. Process 900 is performed, for example, using one or more electronic devices implementing a software platform. In some examples, process 900 is performed using a client-server system, and the blocks of process 900 are divided up in any manner between the server and a client device. In other examples, the blocks of process 900 are divided up between the server and multiple client devices. In other examples, process 900 is performed using only a client device or only multiple client devices. In process 900, some blocks are, optionally, combined, the order of some blocks is, optionally, changed, and some blocks are, optionally, omitted. In some examples, additional steps may be performed in combination with the process 900. Accordingly, the operations as illustrated (and described in greater detail below) are exemplary by nature and, as such, should not be viewed as limiting.

At Block 902, the system can obtain input data including one or more data entries. For example, the system can obtain input data 501. As described above, each data entry can include one or more data items, which can include at least a field name, field value, and properties associated with the data items. In one or more examples, the input data 501 can be pre-processed to produce processed data 511.

At Block 904, the system can generate a key-value set for each data item of a plurality of data items. For example, a plurality of unsorted key-value sets 509 can be generated based on the input data 501. As described above, each key-value set can include a plurality of key elements. For example, the key value set can include at least a first key element and a second key element. For example, key-value set {timestamp:1546329600:0} can correspond to the timestamp data item from document 0, where the timestamp key element corresponds to the timestamp field, the 1546329600 key element corresponds to the corresponding value, and the 0 key element corresponds to the document identifier. In one or more examples, the first key element can correspond to the key element located farthest to the left in the key-value set.

At Block 906, the system can sort the key-value sets based on key elements. For example, as shown in key-value map 507, the plurality of key-value sets are sorted based on the first key element. Key value sets that share the same first key element can then sorted by the second key element, and so on. At Block 908, the system can store the sorted key-value sets in the database.

At Block 910, the system can receive a query indicative of one or more of a field name or a field value. For example, as described above, the system can receive a query to search for documents that include the text "fox". In one or more examples, the system can generate a query term to perform a search on the key-value map. In this example, the query term could correspond to text: "fox". At Block 912, the system can match one or more response key-value sets to the field name or field value indicated in the query. For example, the query for documents that include the text "fox" would provide the following key-value sets: {text: "fox":0} and {text: "fox":1}. At Block 914, the system can retrieve the matched key-value sets and/or the data entry corresponding to the matched key-value sets. In one or more examples, the system can retrieve one or more key elements from the matched key-value sets. For example, the system can retrieve values 0 and 1. At Block 916, the system can generate an output based on the matched key-value sets. For example, the system can retrieve the documents corresponding to document identifier values 0 and 1 as the output. In one or more examples, the system can use the values in the matched key-value sets in an application specific manner to perform one or more database operations. In one or more examples, database operations can include, but not be limited to, creating data, accessing data, moving data, deleting data, and the like. In one or more examples, database operations can further include, but not be limited to, one or more operators such as select, project, join, product, union, intersect, difference, and divide. At Block 918, the system can display the output. For example, the system can display the documents corresponding to values 0 and 1.

Figure 9B:
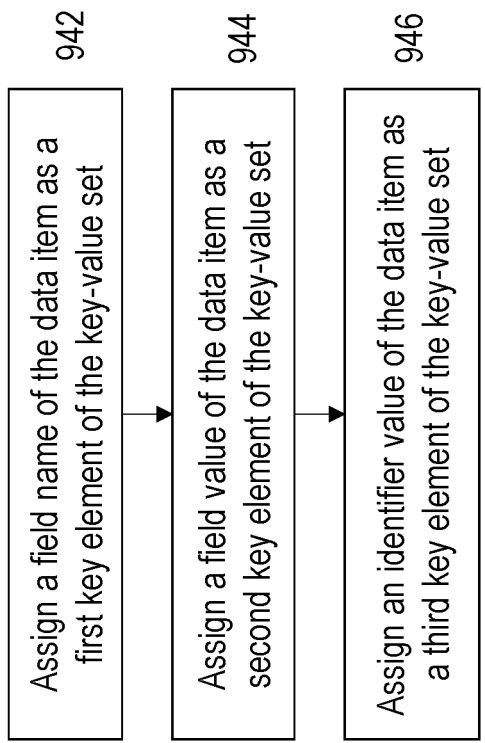

FIG. 9B illustrates a flow chart of a process 904B for obtaining a key-value set for a data item, according to embodiments of the present disclosure. The following description of process 904B will be described with reference to FIGS. 5A-5D to further clarify the process. Process 904B is performed, for example, using one or more electronic devices implementing a software platform. In some examples, process 904B is performed using a client-server system, and the blocks of process 904B are divided up in any manner between the server and a client device. In other examples, the blocks of process 904B are divided up between the server and multiple client devices. In other examples, process 904B is performed using only a client device or only multiple client devices. In process 904B, some blocks are, optionally, combined, the order of some blocks is, optionally, changed, and some blocks are, optionally, omitted. In some examples, additional steps may be performed in combination with the process 904B. Accordingly, the operations as illustrated (and described in greater detail below) are exemplary by nature and, as such, should not be viewed as limiting.

At Block 942, the system can assign a field name of the data item as a first key element of the key-value set. For example, based on the data item "text": "qui" of data entry 0, the system can extract "text" as the first key element. At Block 944, the system can assign a field value of the data item as a second key element of the key-value set. For example, based on the data item "text": "qui" of data entry 0, the system can extract "qui" as the second key element. At Block 946, the system can assign an identifier value of data item as a third key element of the key-value set. For example, based on the identifier item of "id":0, the system can extract 0 as the third key element. Using these key elements, the system can generate a key-value set {"text": "qui":0}. In one or more examples, the key elements can be appended to each other to generate the key-value sets.

In one or more examples, the system can analyze the input data to determine a schema or format for the key-value set. For example, in some embodiments, the system can analyze the input data to determine a schema to generate a key-value set. In one or more examples, the system can analyze the input data (e.g., input data 301) and determine that there should be a one-to-one mapping of data items to key-value sets. For example, as shown in key-value map 307, there is a one-to-one mapping of data items in input data 301 to key-value sets. In one or more examples, this determination may be based on the types of data included in the data items and/or the structure of the data entry.

In one or more examples, the system can analyze the input data, (e.g., input data 401) and determine that there should be a many-to-one mapping of data items to a key-value set. For example, as shown in key-value map 407, there is a many-to-one mapping of data items to a key-value set (e.g., each key value set includes terms from multiple data items). In one or more examples, this determination may be based on the types of data included in the data items and/or the structure of the data entry. For example, the system can identify that the input data includes an identifier and determine that the identifier should be associated with the non-identifier data items. As another example, the system can determine that the input data can be organized as an inverted index and determine the key-value set schema based on this structure.

In one or more embodiments, the system can receive a user input to indicate the schema to generate a key-value set. In such examples, the user input can indicate whether the key-value map should include a one-to-one or may-to-one mapping of data items to a respective key-value set.

Figure 9C:
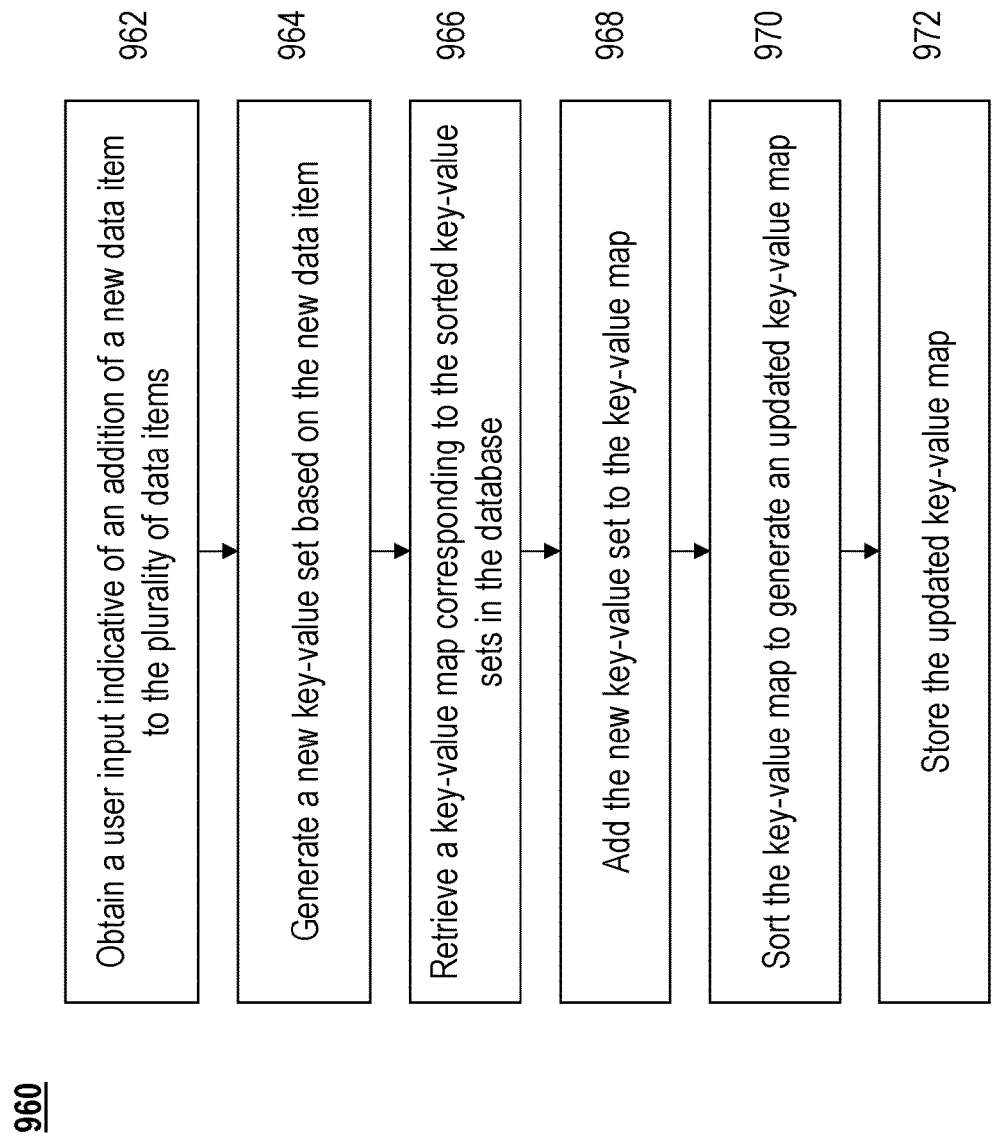

FIG. 9C illustrates a flow chart of a process 960 for adding a new data item to an existing key-value map, according to embodiments of the present disclosure. The following description of process 960 will be described with reference to FIGS. 4A-4D to further clarify the process. Process 960 is performed, for example, using one or more electronic devices implementing a software platform. In some examples, process 960 is performed using a client-server system, and the blocks of process 960 are divided up in any manner between the server and a client device. In other examples, the blocks of process 960 are divided up between the server and multiple client devices. In other examples, process 960 is performed using only a client device or only multiple client devices. In process 960, some blocks are, optionally, combined, the order of some blocks is, optionally, changed, and some blocks are, optionally, omitted. In some examples, additional steps may be performed in combination with the process 960. Accordingly, the operations as illustrated (and described in greater detail below) are exemplary by nature and, as such, should not be viewed as limiting.

At Block 962, the system can obtain a user input indicative of an addition of a new data item to the plurality of data items. For example, referring to input data 401, the data entry corresponding to "id": "10" could be updated to include a new data item "delay": 2. At Block 964, the system can generate a new key-value set based on the new data item. For example, the system can generate a new key-value set {delay: 2:10}. At Block 966, the system can retrieve a key-value map that includes the sorted plurality of key-value sets stored in the database generated in process 900. For example, key-value map 407 can be retrieved. At Block 968, the system can add the new key-value set to the key-value map. At Block 970, the system can sort the key-value map to generate an updated key-value map. For example, the new key-value set, would added to the key-value map 407 and sorted to be the first entry in the key-value map, before {delay:3:20}. At Block 972, the system can store the updated key-value map. While this is described with respect to a single data item, this process could also apply to multiple data items as well as new data entries.

Figure 9D:
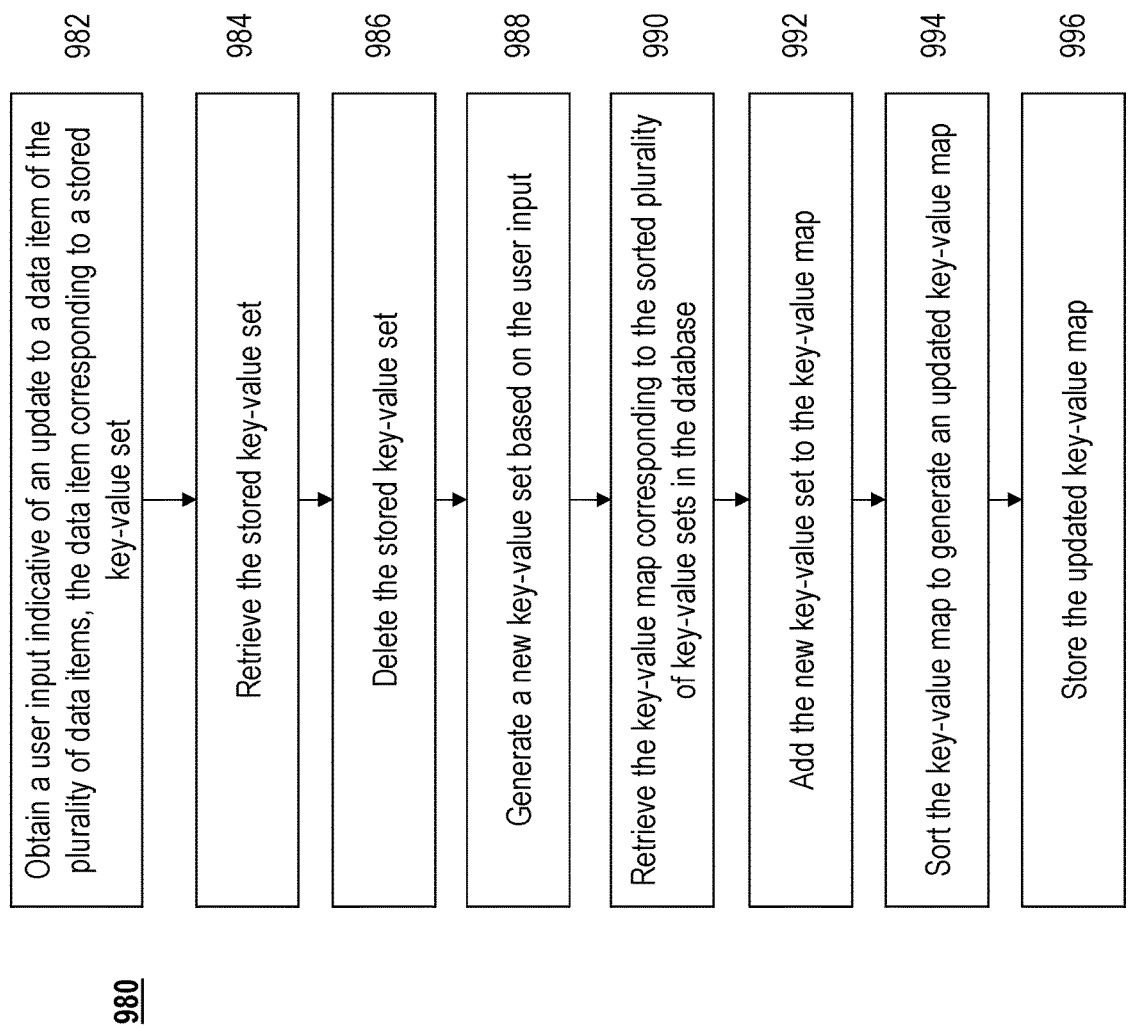

FIG. 9D illustrates a flow chart of a process 980 for updating a data item in an existing key-value map, according to embodiments of the present disclosure. The following description of process 980 will be described with reference to FIGS. 4A-4D to further clarify the process. Process 980 is performed, for example, using one or more electronic devices implementing a software platform. In some examples, process 980 is performed using a client-server system, and the blocks of process 980 are divided up in any manner between the server and a client device. In other examples, the blocks of process 980 are divided up between the server and multiple client devices. In other examples, process 980 is performed using only a client device or only multiple client devices. In process 980, some blocks are, optionally, combined, the order of some blocks is, optionally, changed, and some blocks are, optionally, omitted. In some examples, additional steps may be performed in combination with the process 980. Accordingly, the operations as illustrated (and described in greater detail below) are exemplary by nature and, as such, should not be viewed as limiting.

At Block 982, the system can obtain a user input indicative of an update to a data item of a plurality of data items, where the data item corresponds to a stored key-value set. For example, referring to key-value map 409, the updated data input data may correspond to a change in the value associated with the delay field from 3 to 2 for data item 1. In this example, the stored key-value set could correspond to {delay: 3:10}. At Block 984, the system can retrieve the stored key-value set. For example, the system could retrieve {delay: 3:10}. At Block 986, the system can delete the stored key-value set. For example, the system could delete {delay: 3:10}.

At Block 988, the system can generate a key-value set based on the user input. For example, the system can generate a new key-value set {delay: 2:10}. At Block 990, the system can retrieve a key-value map that corresponding to the sorted plurality of key-value sets stored in the database generated in process 900. For example, key-value map 407 can be retrieved. At Block 992, the system can add the new key-value set to the key-value map. At Block 994, the system can sort the key-value map to generate an updated key-value map. For example, the new key-value set, would be sorted to be the first entry in the key-value map. At Block 996, the system can store the updated key-value map. While this is described with respect to a single data item, this process could also apply to multiple updated data items.

To the extent that processes 900, 904B, 960, and 980 are described with respect to specific figures and examples, these processes are not limited to the example described herein and can extend to other applications.

Figure 10:
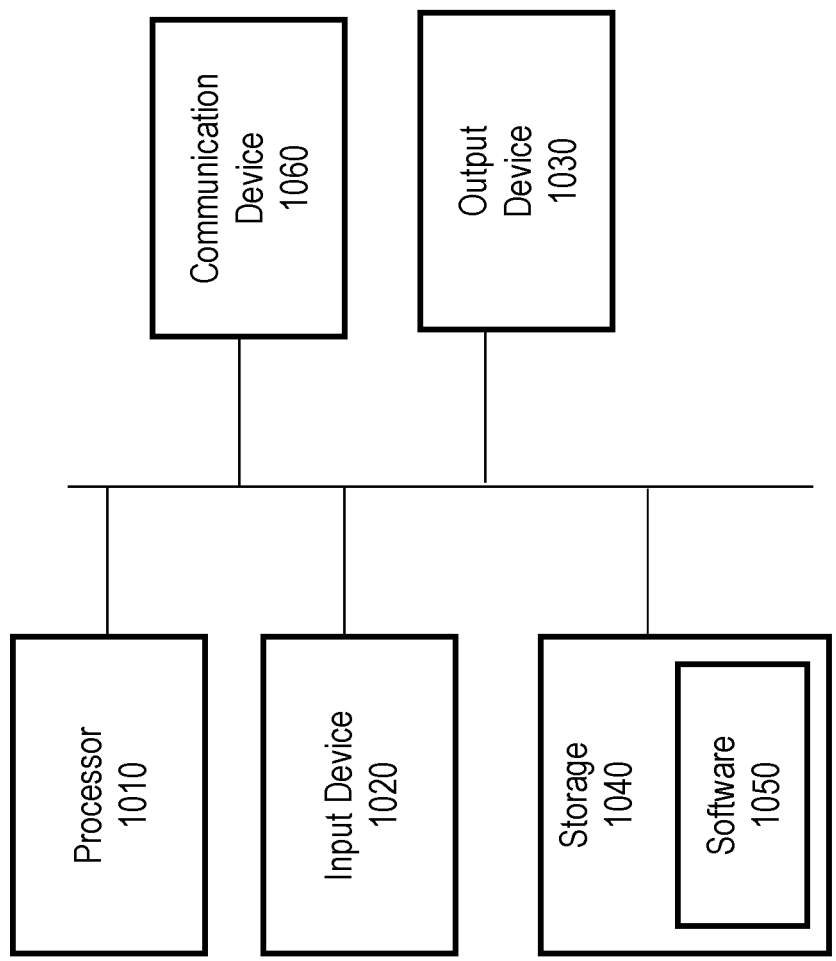
FIG. 10 illustrates an exemplary electronic device, in accordance with embodiments of this disclosure.

The operations described above with reference to the figures are optionally implemented by components depicted in FIG. 10. It would be clear to a person having ordinary skill in the art how other processes are implemented based on the components depicted in FIG. 10.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A method comprising:
obtaining input data comprising one or more data entries for storage in a database, wherein each data entry comprises one or more data items, and wherein each data item comprises a field name and a field value;
pre-processing a data item of the one or more data items by tokenizing a text entry of the data item into a plurality of n-grams wherein the data item is one of a plurality of data items;
in response to tokenizing the text entry, generating a key-value set for the data item including a first key element comprising the field name of the data item, and a second key element comprising the field value of the data item, wherein the field value includes the plurality of n-grams, wherein the key-value set is one of a plurality of key-value sets respectively generated for the plurality of data items, each with field values including respective pluralities of n-grams and wherein the generated key-value set is stored within the database according to a key-value map;
sorting the plurality of key-value sets based on first key elements of the plurality of key-value sets;
storing the sorted plurality of key-value sets in a database, wherein matching the query to the one of the n-grams in the key-value set comprises matching the query to one or more key-value sets containing the one of the n-grams;
receiving a query indicative a queried field value;
matching the query to one of the n-grams in the key-value set reflected in the key-value map;
retrieving one or more key elements corresponding to the key-value set stored within the database;
generating an output based on the one or more key elements; and
providing, for display, the output.

2. The method of claim 1, wherein the plurality of key-value sets are stored in the database as a one-dimensional list.

3. The method of claim 1, further comprising:
obtaining a user input indicative of an addition of a new data item;
generating a new key-value set based on the new data item;
retrieving the key-value map corresponding to the sorted plurality of key-value sets in the database;

adding the new key-value set to the key-value map;
sorting the key-value map to generate an updated key-value map; and
storing the updated key-value map in the database.

4. The method of claim 1, further comprising:
obtaining a user input indicative of an update to a particular data item of the plurality of data items, the particular data item corresponding to a particular key-value set;
retrieving the particular key-value set from the database;
deleting the particular key-value set from the database;
generating a new key-value set based on the user input;
retrieving the key-value map corresponding to the sorted plurality of key-value sets in the database;
adding the new key-value set to the key-value map;
sorting the key-value map to generate an updated key-value map; and
storing the updated key-value map in the database.

5. The method of claim 1, wherein the one or more data entries comprise a first data entry including a first data item, and wherein the first data item is an identifier item including an identifier field and an identifier value.

6. The method of claim 5, wherein generating the plurality of key-value sets comprises obtaining a second key-value set for a second data item by: assigning a field name of the second data item as a first key element of the second key-value set; assigning a field value of the second data item as a second key element of the second key-value set; and assigning the identifier value of the first data item as a third key element of the second key-value set.

7. The method of claim 1, wherein the query comprises a range query.

8. The method of claim 1, wherein the plurality of n-grams comprises a plurality of trigrams.

9. The method of claim 1, wherein retrieving the one or more key elements corresponding to the key-value set is performed without accessing a metadata table.

10. The method of claim 1, further comprising:
determining a key-value set schema based on presence of predefined types of fields in the input data, wherein the key-value set is generated based on the key-value set schema.

11. The method of claim 10, wherein determining the key-value set schema is also based on user input.

12. The method of claim 1, wherein generating the output comprises averaging, summing, or a combination thereof.

13. A non-transitory computer-readable medium storing program instructions that, when executed by one or more processors of a computing system, cause the computing system to perform operations comprising:
obtaining input data comprising one or more data entries for storage in a database, wherein each data entry comprises one or more data items, and wherein each data item comprises a field name and a field value;
pre-processing a data item of the one or more data items by tokenizing a text entry of the data item into a plurality of n-grams wherein the data item is one of a plurality of data items;
in response to tokenizing the text entry, generating a key-value set for the data item including a first key element comprising the field name of the data item, and a second key element comprising the field value of the data item, wherein the field value includes the plurality of n-grams, wherein the key-value set is one of a plurality of key-value sets respectively generated for the plurality of data items, each with field values including respective pluralities of n-grams, and wherein the generated key-value set is stored within the database according to a key-value map;
sorting the plurality of key-value sets based on first key elements of the plurality of key-value sets;
storing the sorted plurality of key-value sets in a database, wherein matching the query to the one of the n-grams in the key-value set comprises matching the query to one or more key-value sets containing the one of the n-grams;
receiving a query indicative a queried field value;
matching the query to one of the n-grams in the key-value set reflected in the key-value map;
retrieving one or more key elements corresponding to the key-value set stored within the database;
generating an output based on the one or more key elements; and
providing, for display, the output.

14. The non-transitory computer-readable medium of claim 13, wherein the plurality of n-grams comprises a plurality of trigrams.

15. The non-transitory computer-readable medium of claim 13, the operations further comprising:
determining a key-value set schema based on presence of predefined types of fields in the input data, wherein the key-value set is generated based on the key-value set schema.

16. A computing system comprising:
a processor;
memory; and
program instructions, stored in the memory, that upon execution by the processor cause the computing system to perform operations comprising:
obtaining input data comprising one or more data entries for storage in a database, wherein each data entry comprises one or more data items, and wherein each data item comprises a field name and a field value;
pre-processing a data item of one or more data items by tokenizing a text entry of the data item into a plurality of n-grams wherein the data item is one of a plurality of data items;
in response to tokenizing the text entry, generating a key-value set for the data item including a first key element comprising the field name of the data item, and a second key element comprising the field value of the data item, wherein the field value includes the plurality of n-grams, wherein the key-value set is one of a plurality of key-value sets respectively generated for the plurality of data items, each with field values including respective pluralities of n-grams, and wherein the generated key-value set is stored within the database according to a key-value map;
sorting the plurality of key-value sets based on first key elements of the plurality of key-value sets;
storing the sorted plurality of key-value sets in a database, wherein matching the query to the one of the n-grams in the key-value set comprises matching the query to one or more key-value sets containing the one of the n-grams;
receiving a query indicative a queried field value;
matching the query to one of the n-grams in the key-value set reflected in the key-value map;

retrieving one or more key elements corresponding to the key-value set stored within the database;
generating an output based on the one or more key elements; and
providing, for display, the output.

* * * * *